United States Patent
Shin

(10) Patent No.: US 8,425,070 B2
(45) Date of Patent: Apr. 23, 2013

(54) BACK-LIGHT UNIT WITH A REFLECTIVE SUPPORT MEMBER AND DISPLAY APPARATUS HAVING THE SAME

(75) Inventor: Kyung Ho Shin, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 307 days.

(21) Appl. No.: 12/666,737

(22) PCT Filed: Jun. 25, 2008

(86) PCT No.: PCT/KR2008/003615
§ 371 (c)(1),
(2), (4) Date: Dec. 24, 2009

(87) PCT Pub. No.: WO2009/002081
PCT Pub. Date: Dec. 31, 2008

(65) Prior Publication Data
US 2010/0328966 A1 Dec. 30, 2010

(30) Foreign Application Priority Data
Jun. 26, 2007 (KR) .................. 10-2007-0062915

(51) Int. Cl.
*F21V 17/06* (2006.01)
*G09F 13/08* (2006.01)
*F21S 4/00* (2006.01)

(52) U.S. Cl.
USPC ............. 362/97.3; 362/236; 362/249.02; 362/223; 362/433; 349/58; 349/64

(58) Field of Classification Search ........ 362/97.2–97.4, 362/236, 249.02, 223, 224, 217.02, 455, 362/433; 349/58, 64
See application file for complete search history.

(56) References Cited

U.S. PATENT DOCUMENTS

| | | | |
|---|---|---|---|
| 5,028,744 A * | 7/1991 | Purcell et al. | 362/97.4 |
| 6,902,300 B2 * | 6/2005 | Lee | 362/306 |
| 7,185,995 B2 | 3/2007 | Hatanaka et al. | |
| 7,192,149 B2 * | 3/2007 | Lai | 362/29 |
| 7,324,174 B2 | 1/2008 | Hafuka et al. | |
| 7,431,475 B2 * | 10/2008 | Hafuka et al. | 362/218 |
| 7,604,365 B2 * | 10/2009 | Chang | 362/97.1 |
| 7,604,390 B2 * | 10/2009 | Zhang et al. | 362/634 |
| 7,667,787 B2 * | 2/2010 | Mahama et al. | 349/64 |
| 7,697,087 B2 * | 4/2010 | Chang | 349/61 |
| 2004/0120161 A1 | 6/2004 | Hwang | |
| 2004/0218388 A1 | 11/2004 | Suzuki | |
| 2005/0073858 A1 * | 4/2005 | Kim et al. | 362/561 |
| 2005/0281050 A1 * | 12/2005 | Chou | 362/612 |
| 2006/0072299 A1 | 4/2006 | Lai | |
| 2007/0103908 A1 * | 5/2007 | Tabito et al. | 362/294 |
| 2008/0002097 A1 * | 1/2008 | Moon et al. | 349/64 |
| 2008/0111949 A1 * | 5/2008 | Shibata et al. | 349/64 |

FOREIGN PATENT DOCUMENTS

| | | |
|---|---|---|
| CN | 1842737 A | 10/2006 |
| JP | 2004-319458 A | 11/2004 |
| KR | 10-2006-0095829 A | 9/2006 |
| KR | 10-2007-0042907 A | 4/2007 |

* cited by examiner

*Primary Examiner* — Ismael Negron
(74) *Attorney, Agent, or Firm* — Birch, Stewart, Kolasch & Birch, LLP

(57) ABSTRACT

A light unit includes a bottom cover, a light source unit, an optical sheet unit on the bottom cover, and a reflective support member. The reflective support member includes a reflection plate for reflecting light and a guide pin for supporting the optical sheet unit in the bottom cover.

17 Claims, 2 Drawing Sheets

BACK-LIGHT UNIT WITH A REFLECTIVE SUPPORT MEMBER AND DISPLAY APPARATUS HAVING THE SAME

TECHNICAL FIELD

Embodiments relate to a light unit and a display apparatus having the same.

BACKGROUND ART

A display device generally used comprises a cathode ray tube (CRT), a liquid crystal display (LCD) device using an electric field and optical effect, a plasma display panel (PDP) using gas discharge, and electro luminescence display (ELD) using an electric filed light emitting effect. Among them, studies for an LCD device is under active development.

The LCD device is used for a monitor of a laptop computer, a monitor of a desktop computer, and a large scale information display device.

Since the LCD device is a device of a light receiving characteristic displaying an image by controlling an amount of light illuminated to an LCD panel, it illuminates light onto the LCD panel using a backlight unit.

DISCLOSURE OF INVENTION

Technical Problem

Embodiments provide a light unit comprising a reflective support member in which a reflection plate and a guide pin are integrally formed, and a display apparatus having the light unit.

Technical Solution

An embodiment provides a light unit comprising: a bottom cover comprising a groove; a light source unit generating light in the bottom cover; an optical sheet unit on the bottom cover; and a reflective support member reflecting light and supporting the optical sheet unit in the bottom cover.

An embodiment provides a light unit comprising: a bottom cover; a light source unit in the bottom cover and comprising a light emitting device generating light; an optical sheet unit on the bottom cover; and a reflective support member comprising a reflection plate in the bottom cover and a support unit integrally formed with the reflection plate to support the optical sheet unit.

An embodiment provides a display apparatus comprising: a light unit comprising a bottom cover; a light source unit comprising a light emitting device generating light in the bottom cover; an optical sheet unit on the bottom cover; and a reflective support member comprising a reflection plate in the bottom cover and a support unit integrally formed with the reflection plate to support the optical sheet unit; and a display panel on the optical sheet unit.

Advantageous Effects

Embodiments dispose a reflective support member inside a bottom cover to allow the reflective support member to reflect light and support an optical sheet in the bottom cover.

Embodiments provide a reflection plate and a guide pin in one member, thereby reducing an assembling process of a light unit.

Embodiments can provide a heat-sink path using a reflective support member disposed inside a bottom cover to effectively radiate heat generated from a light unit.

BEST MODE FOR CARRYING OUT THE INVENTION

Reference will now be made in detail to the embodiments of the present disclosure with reference to the accompanying drawings.

Figure 1:
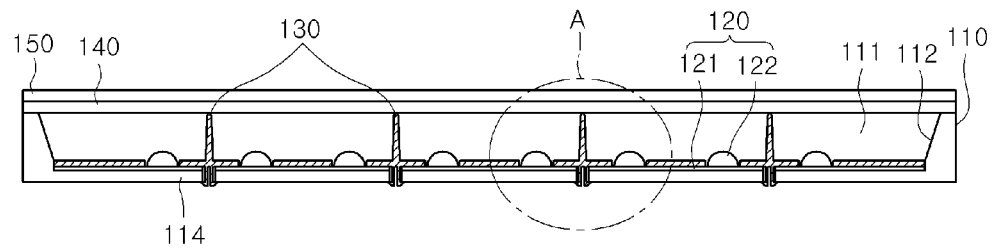
FIG. 1 is a side cross-sectional view of a display apparatus according to a first embodiment.
Figure 2:
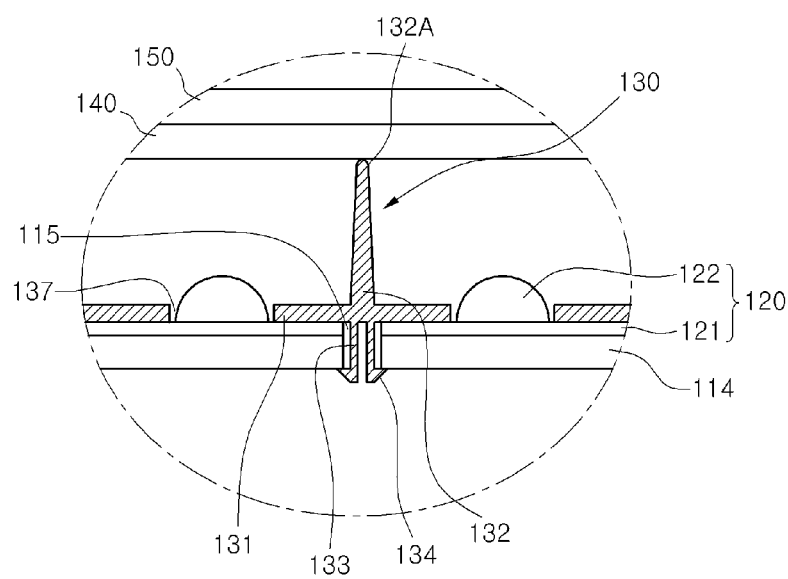
FIG. 2 is an enlarged view of the portion A of FIG. 1.
Figure 3:
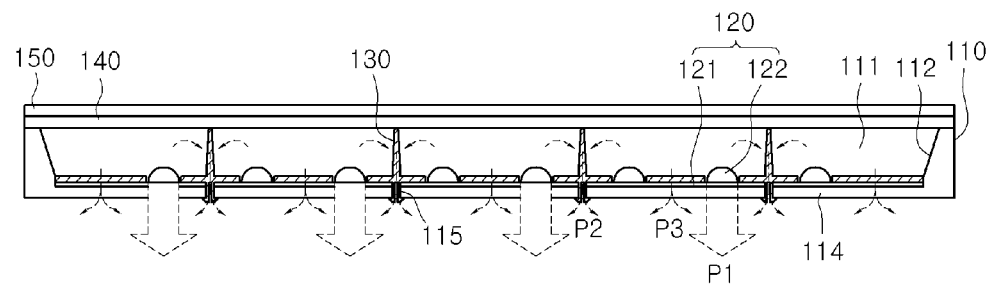
FIG. 3 is a view illustrating a heatsink path of the light unit of FIG. 1.

FIG. 1 is a side cross-sectional view of a display apparatus according to a first embodiment, FIG. 2 is an enlarged view of the portion A of FIG. 1, and FIG. 3 is a view illustrating a heat-sink path of the light unit of FIG. 1.

Referring to FIGS. 1 and 2, the display apparatus 100 comprises a bottom cover 110, a light source unit 120, a reflective support member 130, an optical sheet unit 140, and a display panel 150.

A groove 111 of a predetermined depth, for example, a case-shaped groove is formed inside the bottom cover 110. The bottom cover 110 can be formed of a metal material, for example, Al, Mg, Zn, Ti, Ta, Hf, and Nb, but is not limited thereto.

An inner lateral side 112 of the bottom cover 110 can be inclined at a predetermined angle with respect to a bottom plate 114 of the bottom cover 110. A reflective material (for example, Ag) can be coated or a reflective sheet can be attached on the inner lateral side 112. The bottom cover 110 serves as a chassis. There is no limitation in the shape and the lateral side structure of the bottom cover 110.

One or more holder holes 115 are formed in the bottom plate 114 of the bottom cover 110, and the holder hole 115 allows the groove 111 of the bottom cover 110 to communicate with a lower surface.

The light source unit 120 and the reflective support member 130 are received in the groove 111 of the bottom cover 110. The light source unit 120 is disposed in the groove 111 of the bottom cover 110, and the reflective support member 130 is disposed on the light source unit 120.

The light source unit 120 comprises a board 121 and a light emitting diode (LED) 122. The board 121 comprises a metal core printed circuit board (PCB), FR-4 PCB, and a general PCB, and can be modified within the technical scope of the embodiment and is not limited thereto.

One or more boards 121 can be disposed in the groove 111 of the bottom cover 110. One or more light emitting diodes (LEDs) 122 are electrically connected to the board 121, and a plurality of LEDs 122 can be mounted on the board 121 in row and/or column configurations but is not limited thereto. Also, the LED 122 is directly mounted on the board 121 in a hemisphere or dome shape, or in a package shape, and is not limited thereto.

The LED 122 is a light emitting device emitting light. For example, the LED 122 can comprise a color LED chip or a combination of a color LED chip or a ultra-violet (UV) LED chip and a phosphor body. For example, the LED 122 can realize white light using a white LED, red/green/blue LEDs, a blue LED and a phosphor, or a UV LED and a phosphor, but is not limited thereto. Also, for a light source, not only the LED 122 but also a fluorescent lamp (e.g.: cold cathode fluorescent lamp) or a mixture of an LED and a fluorescent lamp can be applied.

The reflective support member 130 is formed of a metal material to reflect light from the groove 111 of the bottom cover 110 and support elements installed on the bottom cover 110. The reflective support member 130 comprises a reflection plate 131 and a guide pin 132 integrally formed.

The reflective support member 130 is disposed on a portion of the board 121 at the groove 111 of the bottom cover 110 and allows the upper portion of the LED 122 to protrude.

The reflection plate 131 can be formed of a metal material having excellent thermal conductivity and reflectivity (e.g.: Al, Ag, or a compound thereof). Alternatively, a reflective material such as Ag and Al can be plated or coated or attached in the form of a sheet on the surface of the reflection plate 131.

The reflection plate 131 can contact or can be attached in one plate shape or a plate shape of a predetermined size on the board 121. There is no limitation in the size and a fixing method of the reflection plate 131. Also, a device insertion hole 137 is formed in the reflection plate 131 to correspond to the LED 122. The upper portion of the LED 122 mounted on the board 121 protrudes through the device insertion hole 137. Here, one device insertion hole 137 can be formed in such a size as to receive one or more LEDs 122.

One or more guide pins 132 are integrally formed on the reflection plate 131 and formed in a prism shape (e.g.: a triangular pyramid and a triangular prism) perpendicularly to the reflection plate 131. The guide pin 132 protrudes above the reflection plate 131.

The reflective support member 130 can be fixed in the groove 111 of the bottom cover 110, or fixed on the rear surface of the bottom cover 110. That is, the reflective support member 130 can be fixed using an adhesive and/or an instrumental structure. For example, the reflective support member 130 can be attached on the board 121 using an adhesive, or can be fixed to the bottom cover by forming a holder 133 under the reflection plate 131. The holder 133 may not be formed under the reflection plate 131.

The holder 133 is a means for supporting the reflective support member 130 at the bottom cover 110, and passes through the holder hole 115. The holder 133 can be fixed using a hook manner or a separate assembly structure. The structure of the holder 133 can be changed in various shapes. The holder hole 115 is formed in the bottom plate 114 of the bottom cover 110, and the board 121.

A hook 134 is formed at the end of the holder 133, and passes through the holder hole 115 of the bottom cover 110, and is hooked at the lower surface of the bottom cover 110. Therefore, the reflective support member 130 can be fixed.

Since the holder 133 is coupled to the holder hole 115 of the bottom cover 110 in a detachable structure, assembling of the reflective support member 130 can be performed conveniently. Also, since the holder 133 is exposed to the lower surface through the groove 111 of the bottom cover 110, it can serve as a heatsink.

The light source unit 120 and the reflective support member 130 are coupled to the groove 111 of the bottom cover 110, and the optical sheet unit 140 is stacked on the bottom cover 110. At this point, the optical sheet unit 140 is supported by the guide pin 132 of the reflective support member 130, so that it does not fall in the lower direction. That is, an end 132A of the guide pin 132 contacts the lower surface of the optical sheet unit 140.

The optical sheet unit 140 can comprise a diffusion sheet (not shown) and/or a prism sheet (not shown). The diffusion sheet diffuses light emitted from the LED 122, and the diffused light is condensed by the prism sheet. Here, the prism sheet can be selectively realized using a horizontal and/or vertical prism sheet, and one or more luminosity enhancement film.

A display panel (e.g.: LCD panel) 150 is located on the optical sheet unit 140 to display information using light emitted from the optical sheet unit 140.

The first embodiment couples the reflective support member 130 into the bottom cover 110 to allow the reflective support member 130 reflects light and supports the optical sheet unit 140. Also, a limitation of having to assemble the guide pin and the reflection plate separately is removed, so that an assembling process is simplified.

FIG. 3 is a view illustrating a heat-sink path of the light unit of FIG. 1.

Referring to FIG. 3, heat generated from the LED 122 located in the groove 111 of the bottom cover 110 is conducted from the board 121 to the bottom plate 114 of the bottom cover 110 and thus radiated (P1 and P3). Also, the heat can be radiated through a path P2 in which the heat is conducted along the guide pin and the reflection plate of the reflective support member 130, and the holder, and radiated to the lower side of the bottom cover 110.

The first embodiment couples the reflective support member 130 inside the bottom cover 110 to the bottom plate 114 of the bottom cover 110, thereby more effectively perform a heatsink operation by the reflective support member 130.

Figure 4:
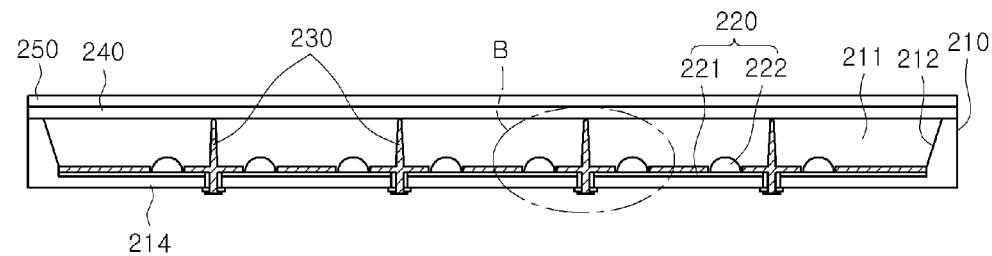
FIG. 4 is a side cross-sectional view of a display apparatus according to a second embodiment.
Figure 5:
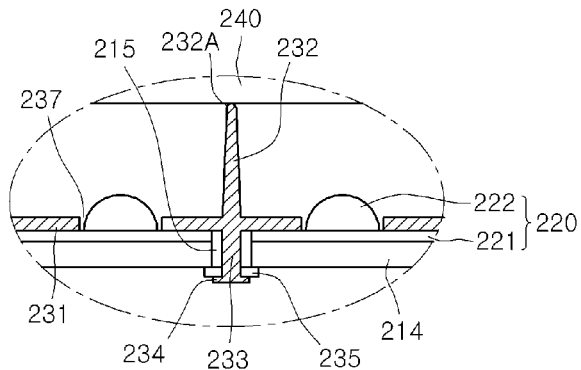
FIG. 5 is an enlarged view of the portion B of FIG. 4.
Figure 6:
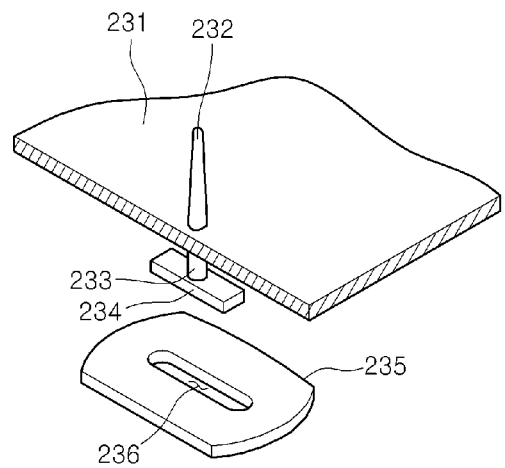
FIG. 6 is a perspective view illustrating an example of coupling of a reflective support member according to the second embodiment.

FIG. 4 is a side cross-sectional view of a display apparatus according to a second embodiment, FIG. 5 is an enlarged view of the portion B of FIG. 4, and FIG. 6 is a perspective view illustrating an example of coupling of a reflective support member according to the second embodiment. In describing the second embodiment, descriptions of the same parts as those of the first embodiment are omitted.

Referring to FIGS. 4 and 5, the display apparatus 200 comprises a bottom cover 210, an internal lateral cover 212, a light source unit 220 comprising a board 221 and LEDs 222, a reflective support member 230, an optical sheet unit 240, and a display panel 250. The LEDs are in a groove 211 of the bottom cover 210.

The reflective support member 230 comprises a reflection plate 231, a guide pin 232, and a holder 233 integrally formed. An end 232A of the guide pin 232 contacts the lower surface of the optical sheet unit 240. A hooking threshold 234 is formed at the end of the holder 233. The hooking threshold 234 passes through a bottom plate 214 of the bottom cover 210, and a holder hole 215 formed in the board 221 to protrude to the lower surface of the bottom cover 210. A support 235 is fit around the hooking threshold 234 that has protruded to the bottom cover 210.

Referring to FIG. 6, a hooking threshold insertion hole 236 is formed in the support 235 to receive the hooking threshold 234. At this point, the hooking threshold 234 inserted into the hooking threshold insertion hole 236 of the support 235 is rotated by a predetermined angle, for example, 30-120° Accordingly, the support 235 becomes hooked by the hooking threshold 234. This state, as shown in FIGS. 4 and 5, the support 235 is coupled between the hooking threshold 234 and the bottom plate 214 of the bottom cover 210, so that the reflective support member 230 can be fixed in the bottom cover 210.

Meanwhile, a female screw thread is formed in the hooking threshold 234, and a male screw thread is formed in the hole 236 of the support 235, and they are then coupled to each other, so that the hooking threshold 234 can be fixed in the support 235.

The second embodiment provides the reflective support member 230 in which light reflection inside the bottom cover 210 and support of the optical sheet unit are integrated to reduce an assembly process and more effectively perform a heatsink operation.

Figure 7:
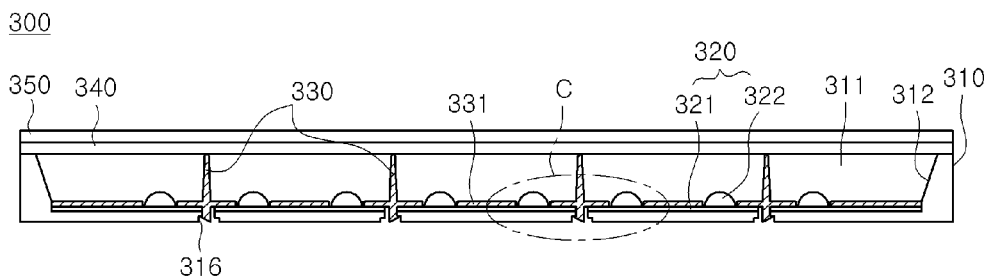
FIG. 7 is a side cross-sectional view of a display apparatus according to a third embodiment.
Figure 8:
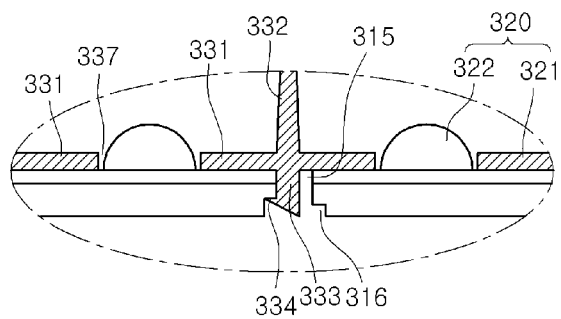
FIG. 8 is an enlarged view of the portion C of FIG. 7.

FIG. 7 is a side cross-sectional view of a display apparatus according to a third embodiment, and FIG. 8 is an enlarged view of the portion C of FIG. 7. In describing the second embodiment, descriptions of the same parts as those of the first embodiment are omitted.

Referring to FIGS. 7 and 8, the display apparatus 300 comprises a bottom cover 310, an internal lateral side 312, a light source unit 320 comprising a board 321 and a light emitting diode 322, a reflective support member 330, an optical sheet unit 340, and a display panel 350.

Here, a holder hole 315 is formed in a bottom plate 314 of the bottom cover 310, and the board 321. A hook insertion groove 316 is formed in the lower portion of the holder hole 315.

The reflective support member 330 couples to an inner groove 311 of the bottom cover 310. The reflective support member 330 comprises a reflection plate 331, a guide pin 332, and a holder 333 integrally formed.

The holder 333 of the reflective support member 330 protrudes below the reflection plate 331. A hook 334 is formed at the end of the holder 333.

When the holder 333 that has protruded below the reflection plate 331 is inserted into the holder hole 315 formed in the board 321 and the bottom plate 314 of the bottom cover 310, the hook 334 of the holder 333 is hooked at the hook insertion groove 316 of the bottom cover 310. At this point, since the hook 334 is disposed in the hook insertion groove 316, the hook 334 does not protrude to the lower surface of the bottom cover 310, so that the appearance of the bottom cover 310 can become elegant.

The hook 334 formed at the end of the holder 333 of the reflective support member 330 can protrude in both directions opposite to each other. For example, the hook 334 can comprise a left hook hooked at one side of the hook insertion groove 316 or a right hook hooked at the other side of the hook insertion groove 316. The left and right hooks are formed in turns. Accordingly, the holder 333 of the reflective support member 330 can be more solidly fixed on the bottom cover 310.

As described above, the embodiment provides the reflective support member 330 in which light reflection inside the bottom cover 210 and support of the optical sheet unit are integrated to reduce an assembly process and more effectively perform a heatsink operation.

Although embodiments have been described with reference to a number of illustrative embodiments thereof, it should be understood that the embodiments are provided for descriptive purposes and not for limitation. A person of ordinary skill in the art would understand numerous other modifications and embodiments can be devised that will fall within the spirit and scope of the principles of this disclosure.

INDUSTRIAL APPLICABILITY

Embodiments dispose a reflective support member inside a bottom cover to reflect light and support an optical sheet unit.

Embodiments provide a reflection plate and a guide pin in one member to reduce an assembly process of a light unit.

Embodiments can provide a heatsink path using a reflective support member disposed inside a bottom cover to effectively radiate heat generated from a light unit.

The invention claimed is:

1. A light unit comprising:
   a bottom cover;
   a light source unit in the bottom cover and comprising a light emitting device generating light;
   an optical sheet unit on the bottom cover; and
   a reflective support member on the bottom cover, the reflective support member comprising:
      a reflection plate,
      a support unit, and
      a holder,
   wherein the light source unit comprises a board, and
   wherein the holder contacts the board.

2. The light unit according to claim 1, wherein the holder of the reflective support member is inserted into a holder insertion hole formed in the board and the bottom plate of the bottom cover.

3. The light unit according to claim 1, wherein the reflection plate covers a region excluding the light emitting device of the light source unit on the bottom plate of the bottom cover.

4. The light unit according to claim 1, wherein the holder is fixed on a lower surface of the bottom cover using at least one of a hook manner, a screw manner, and a support manner.

5. A display apparatus comprising:
   a light unit comprising a bottom cover;
   a light source unit comprising a light emitting device generating light in the bottom cover;
   an optical sheet unit on the bottom cover;
   a reflective support member on the bottom cover, the reflective support member comprising:
      a reflection plate,
      a support unit, and
      a holder; and
   a display panel on the optical sheet unit,
   wherein the reflection plate and the support unit are formed of substantially the same material,
   wherein the light source unit comprises a board on which the light emitting device is mounted, and
   wherein the holder contacts the board.

6. The display apparatus according to claim 5, wherein the reflection plate comprises a light emitting device insertion hole, and the reflection plate is attached on the board.

7. A light unit comprising:
   a bottom cover comprising a groove;
   a light source unit generating light in the bottom cover;
   an optical sheet unit on the bottom cover; and
   a reflective support member on the bottom cover, the reflective support member comprising:
      a reflection plate for reflecting light,
      a guide pin for supporting the optical sheet unit, and
      a holder, wherein the light source unit comprises:
  a board between the bottom cover and the reflection plate of the reflective support member; and
wherein the holder contacts the board.

8. The light unit according to claim 7, wherein the reflection plate and the guide pin are formed of a reflective metal material.

9. The light unit according to claim 8, wherein the reflective metal material is plated or coated on a surface of the reflection plate.

10. The light unit according to claim 7, further comprising:
a holder hole in the bottom cover,
  wherein the holder corresponds to the holder hole.

11. The light unit according to claim 10, further comprising a hooking threshold provided at an end of the holder; and
  a support fit between the bottom plate of the bottom cover and the hooking threshold.

12. The light unit according to claim 10, wherein the holder radiates heat conducted from the reflection plate and the guide pin to an outside of the bottom cover.

13. The light unit according to claim 10, further comprising a hook provided at an end of the holder.

14. The light unit according to claim 13, wherein a hook insertion groove is provided in the holder hole to receive the hook of the holder.

15. The light unit according to claim 10, wherein the light source unit further comprises:
  one or more light emitting devices on the board.

16. The light unit according to claim 15, wherein the reflection plate is attached on the board using an adhesive.

17. The light unit according to claim 15, wherein the reflection plate comprises a device insertion hole corresponding to the light emitting device.

* * * * *